US012026676B2

(12) United States Patent
Hayes et al.

(10) Patent No.: US 12,026,676 B2
(45) Date of Patent: Jul. 2, 2024

(54) SYSTEMS AND METHODS FOR VERIFYING INTEGRITY OF ASSOCIATE TRAINING

(71) Applicant: Walmart Apollo, LLC, Bentonville, AR (US)

(72) Inventors: Jason S. Hayes, Bentonville, AR (US); Timothy J. Burleson, Bentonville, AR (US); John S. Meredith, Bentonville, AR (US); Andrew B. Millhouse, Gilbert, AZ (US); Jennifer L Hedges, Lowell, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 32 days.

(21) Appl. No.: 17/866,275

(22) Filed: Jul. 15, 2022

(65) Prior Publication Data

US 2022/0351145 A1 Nov. 3, 2022

Related U.S. Application Data

(63) Continuation of application No. 16/813,141, filed on Mar. 9, 2020, now abandoned.

(Continued)

(51) Int. Cl.
  *G06Q 10/10* (2023.01)
  *G06Q 10/02* (2012.01)
  (Continued)

(52) U.S. Cl.
  CPC . *G06Q 10/1053* (2013.01); *G06Q 10/063114* (2013.01); *G06Q 10/06398* (2013.01); *G06V 20/52* (2022.01)

(58) Field of Classification Search
  CPC ....... G06Q 10/1053; G06Q 10/063114; G06Q 10/06398; G06V 20/52
  (Continued)

(56) References Cited

U.S. PATENT DOCUMENTS 7,260,355 B2  8/2007  L Allier
9,710,980 B1  7/2017  Alzahrani
(Continued)

OTHER PUBLICATIONS

The Glossary of Education Reform; "Scaffolding"; https://www.edglossary.org/scaffolding/; Apr. 6, 2015; pp. 1-4.
(Continued)

*Primary Examiner* — Jonathan P Ouellette
(74) *Attorney, Agent, or Firm* — Fitch, Even, Tabin & Flannery LLP (57) ABSTRACT

In some embodiments, apparatuses and methods are provided herein useful to verifying integrity of associate training. In some embodiments, there is provided a system for verifying integrity of associate training at a facility including a plurality of wireless devices; a plurality of sensors; one or more databases; and a control circuit. By one approach; the control circuit is configured to: receive first and second associate identifiers; determine first, second, and third areas; determine whether the first, second, and third areas each correspond to the same area, wherein the determination verifies that the trainer-associate is with the trainee-associate at a designated area associated with a first training module; and provide a verification message that the first training module has been completed.

22 Claims, 5 Drawing Sheets

Related U.S. Application Data (60) Provisional application No. 62/822,597, filed on Mar. 22, 2019.

(51) Int. Cl.
*G06Q 10/06* (2023.01)
*G06Q 10/0631* (2023.01)
*G06Q 10/0639* (2023.01)
*G06Q 10/1053* (2023.01)
*G06Q 30/02* (2023.01)
*G06Q 30/06* (2023.01)
*G06V 20/52* (2022.01)

(58) Field of Classification Search
USPC .................................. 705/1.1, 320, 321, 326
See application file for complete search history.

(56) References Cited

U.S. PATENT DOCUMENTS

| | | | |
|---|---|---|---|
| 9,786,193 B2 | 10/2017 | Falash | |
| 2012/0176220 A1 | 7/2012 | Garcia | |
| 2014/0207914 A1 | 7/2014 | Robinson | |
| 2014/0322682 A1 | 10/2014 | Baym | |
| 2015/0213722 A1 | 7/2015 | Nypl | |
| 2015/0339943 A1* | 11/2015 | Khan | G09B 19/16 |
| | | | 434/30 |
| 2016/0127363 A1 | 5/2016 | Vea Orte | |
| 2016/0196758 A1 | 7/2016 | Causevic | |
| 2016/0302034 A1 | 10/2016 | Sophinos | |
| 2016/0307459 A1* | 10/2016 | Chestnut | G06F 3/16 |
| 2017/0025040 A1 | 1/2017 | Maturana | |
| 2019/0108766 A1* | 4/2019 | Macallum | G09B 5/02 |
| 2020/0302399 A1 | 9/2020 | Hayes | |

OTHER PUBLICATIONS

USPTO; U.S. Appl. No. 16/813,141; Non-Final Rejection mailed Dec. 22, 2021; (11 pages).
USPTO; U.S. Appl. No. 16/813,141; Notice of Allowance and Fees Due (PTOL-85) mailed Apr. 15, 2022; (10 pages).

* cited by examiner

SYSTEMS AND METHODS FOR VERIFYING INTEGRITY OF ASSOCIATE TRAINING

CROSS-REFERENCE TO RELATED APPLICATION

This application is a continuation of U.S. application Ser. No. 16/813,141 filed Mar. 9, 2020, which claims the benefit of U.S. Provisional Application No. 62/822,597 filed Mar. 22, 2019, all of which are incorporated herein by reference in their entirety.

TECHNICAL FIELD

This invention relates generally to associate training.

Background

Generally, training an employee/associate is through an online web training, classroom setting, or on-the-job training. As such, a signed roster and a log computer are ways to verify that an associate has been trained on a particular task. However, if the training is via on-the-job training, then there is no way to verify that the associate has been trained on the particular task other than by asking the person that trained the associate. However, there is no way to independently verify that the on-the-job training did occur.

BRIEF DESCRIPTION OF THE DRAWINGS

Disclosed herein are embodiments of systems, apparatuses and methods pertaining to verifying integrity of associate training. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for verifying integrity of associate training. In some embodiments, a system for verifying integrity of associate training at a facility including a plurality of wireless access points distributed throughout a facility. By one approach, each wireless access point of the plurality of wireless access points may be associated with a first particular area of a plurality of areas in the facility. In one configuration, the system may include a plurality of cameras distributed throughout the facility. In some implementations, the plurality of cameras may be distributed throughout the facility in areas designated for work, excluding breakrooms and other areas not designated for work. By one approach, one or more cameras of the plurality of cameras may capture one or more images taken from a second particular area of the plurality of areas. Alternatively or in addition to, the system may include one or more databases configured to store at least one of: a plurality of training modules, a first plurality of associations of each of the plurality of areas with at least one of the plurality of training modules, a second plurality of associations of each of the plurality of areas with at least one of the plurality of cameras, and a plurality of images associated with a plurality of associates. Alternatively or in addition to, the system may include a remote control circuit communicatively coupled to the plurality of wireless access points, the one or more databases, and the plurality of cameras. Alternatively or in addition to, the system may include a portable electronic device communicatively coupled to the remote control circuit. By one approach, the portable electronic device may include a wireless transceiver communicatively coupled to a first wireless access point of the plurality of wireless access points at a first time. In one configuration, the first wireless access point may be proximate to the portable electronic device. In some implementation, the portable electronic device may include a local control circuit. For example, the local control circuit may receive an input initiating a training interface. Alternatively or in addition to, the local control circuit may, in response to the initiation of the training interface, prompt a user to provide a first associate identifier associated with a trainee-associate of the plurality of associates. Alternatively or in addition to, the local control circuit may prompt the user to provide a second associate identifier associated with a trainer-associate of the plurality of associates. Alternatively or in addition to, the local control circuit may, in response to receiving the first and second associate identifiers, initiate a first training module of the plurality of training modules associated with the trainee-associate.

By one approach, the remote control circuit may receive the first and second associate identifiers. Alternatively or in addition to, the remote control circuit may receive the one or more images taken by the one or more cameras at the first time. Alternatively or in addition to, the remote control circuit may determine whether a portion of the one or more images substantially correspond to a stored image of the plurality of images associated with the trainer-associate. By one approach, the remote control circuit may, in response to the determination that the portion of the one or more images substantially correspond to the stored image, determine a first area associated with the one or more cameras via a first access to the one or more databases. Alternatively or in addition to, the remote control circuit may determine a second area associated with the first training module via a second access to the one or more databases. Alternatively or in addition to, the remote control circuit may determine a third area associated with the first wireless access point communicatively coupled to the portable electronic device. Alternatively or in addition to, the remote control circuit may determine whether the first area, the second area, and the third area each correspond to the same area. By one approach, the determination that the first, second, and/or third areas correspond to the same area verifies that the trainer-associate is with the trainee-associate at a designated area of the plurality of areas associated with the training module. Alternatively or in addition to, the remote control circuit may, in response to the first, second, and/or third areas corresponding to the same area and subsequent to a completion of the first training module, provide a verification message to the portable electronic device that the first training module has been completed.

In some embodiments, a method for verifying integrity of associate training at a facility includes receiving, by a local control circuit of a portable electronic device, an input initiating a training interface. By one approach, the portable electronic device may include a wireless transceiver communicatively coupled to a first wireless access point of a plurality of wireless access points distributed throughout a facility. In one configuration, the first wireless access point may be proximate to the portable electronic device. By one approach, each wireless access point of the plurality of wireless access points may be associated with a first particular area of a plurality of areas in the facility. Alternatively or in addition to, the method may include, in response to the initiating of the training interface, prompting, by the local control circuit, a user to provide a first associate identifier associated with a trainee-associate of the plurality of associates. Alternatively or in addition to, the method may include prompting, by the local control circuit, the user to provide a second associate identifier associated with a trainer-associate of the plurality of associates. Alternatively or in addition to, the method may include, in response to receiving the first and second associate identifiers, initiating, by the local control circuit, a first training module of a plurality of training modules associated with the trainee-associate. By one approach, one or more databases may store at least one of: the plurality of training modules, a first plurality of associations of each of the plurality of areas with at least one of the plurality of training modules, a second plurality of associations of each of the plurality of areas with at least one of a plurality of cameras distributed throughout the facility, and a plurality of images associated with a plurality of associates. For example, one or more cameras of the plurality of cameras may capture one or more images taken from a second particular area of the plurality of areas.

Alternatively or in addition to, the method may include receiving, by a remote control circuit communicatively coupled to the plurality of wireless access points, the one or more databases, and/or the plurality of cameras, the first and second associate identifiers. By one approach, the method may include receiving, by the remote control circuit, the one or more images taken by the one or more cameras. Alternatively or in addition to, the method may include determining, by the remote control circuit whether a portion of the one or more images substantially correspond to a stored image of the plurality of images associated with the trainer-associate. Alternatively or in addition to, the method may include, in response to the determining that the portion of the one or more images substantially correspond to the stored image, determining, by the remote control circuit, a first area associated with the one or more cameras via a first access to the one or more databases. By one approach, the method may include determining, by the remote control circuit, a second area associated with the first training module via a second access to the one or more databases. Alternatively or in addition to, the method may include determining, by the remote control circuit, a third area associated with the first wireless access point communicatively coupled to the portable electronic device. Alternatively or in addition to, the method may include determining, by the remote control circuit, whether the first area, the second area, and/or the third area each correspond to the same area. By one approach, the determination that the first, second, and/or third areas correspond to the same area verifies that the trainer-associate is with the trainee-associate at a designated area of the plurality of areas associated with the training module. Alternatively or in addition to, the method may include, in response to the first, second, and/or third areas corresponding to the same area and/or subsequent to a completion of the first training module, providing, by the remote control circuit, a verification message to the portable electronic device that the first training module has been completed.

Figure 1:
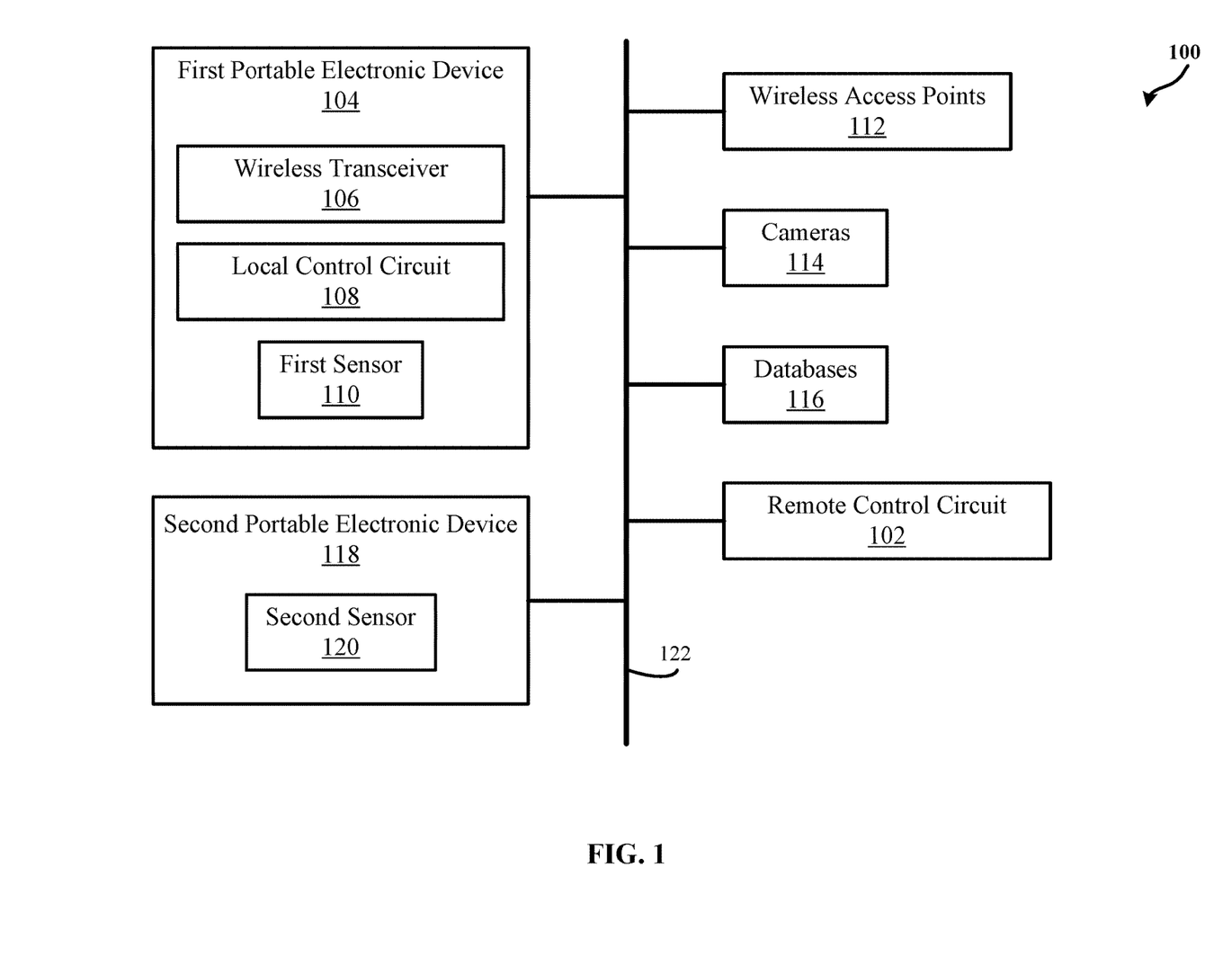
FIG. 1 illustrates a simplified block diagram of an exemplary system for verifying integrity of associate training in accordance with some embodiments.
Figure 2:
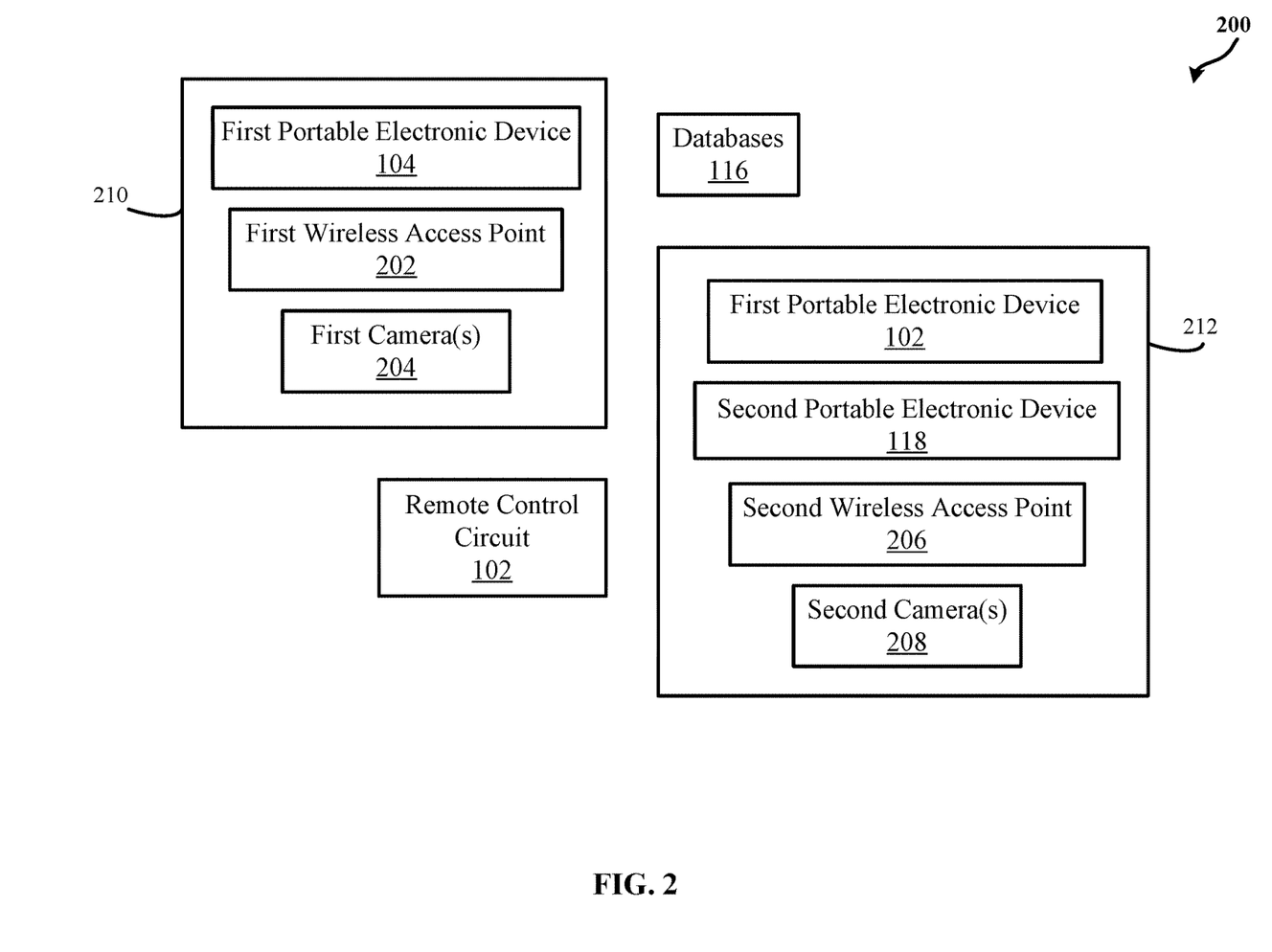
FIG. 2 is a simplified schematic illustration of an exemplary system for verifying integrity of associate training at a facility in accordance with some embodiments.

To illustrate, FIGS. 1 through 4 are described below. In illustrated non-limiting examples described below, FIG. 1, FIG. 2, and/or FIGS. 3A-3B may be concurrently described. For example, FIG. 1 illustrates a simplified block diagram of an exemplary system 100 for verifying integrity of associate training in accordance with some embodiments. FIG. 2 is a simplified schematic illustration of an exemplary system for verifying integrity of associate training at a facility in accordance with some embodiments. FIGS. 3A and 3B show a flow diagram of an exemplary process of verifying integrity of associate training in accordance with some embodiments. By one approach, the system 100 includes a plurality of wireless access points 112 distributed throughout a facility 200 of FIG. 2. For example, a wireless access point 112 may include a beacon wireless access point, a WIFI access point, a global positioning satellite (GPS) access point, among other types of wireless communication protocols used in a wireless network. In some implementations, each wireless access point of the plurality of wireless access points 112 may be associated with a first particular area of a plurality of areas in the facility 200. For example, the facility 200 may include a distribution center, a retail store, a warehouse facility, and/or the like. In such an example, the facility may include a plurality of areas where each area may be associated with a particular type of activity of a plurality of activities commonly associated the type of facility. For example, in a retail store, the areas may include a front-end of the retail store, a back-end of the retail store, checkout areas, sales floor, loading/unloading docks, food area, banking area, among other type of areas associated with the retail store. As such, an access by a first portable electronic device 104 to a wireless access point 112 may enable a remote control circuit 102 to determine that the first portable electronic device 104 is located in a particular area in the facility 200.

In one configuration, the system 100 may include a plurality of cameras 114 distributed throughout the facility 200. By one approach, one or more cameras of the plurality of cameras 114 may capture one or more images taken from a second particular area of the plurality of areas at the facility 200. For example, each camera may provide sensor coverage on a particular area in the facility 200. In some example, a first camera may provide a sensor coverage on at least a portion of an area already covered by a second camera. In such an example, the system 100 via a remote control circuit 102 may access one or more databases 116 to determine a predetermined assignment of coverage for each camera of the plurality of areas at the facility 200. Alternatively or in addition to, the remote control circuit 102 may process images captured by the first and second cameras to determine which one of the cameras has a better sensor coverage on an area within the cameras' sensing distance. As such, for example, a determination by the remote control circuit 102 which one of the plurality of cameras 114 captured the images received by the remote control circuit 102 enable the remote control circuit 102 to determine which particular area in the plurality of areas in the facility 200 the images where taken.

In another configuration, the system 100 may include the one or more databases 116 that stores at least one of: a plurality of training modules, a first plurality of associations of each of the plurality of areas with at least one of the plurality of training modules, a second plurality of associations of each of the plurality of areas with at least one of the plurality of cameras, and a plurality of images associated with a plurality of associates. For example, the one or more databases 116 may include one or more memory devices including computer hardware integrated circuits capable of storing information for immediate and/or future use in a computer, a laptop, a tablet, a server, an electronic device, a smartphone, a smartwatch, and/or the like. In one scenario, the one or more memory devices may include random-access memory (RAM), read-only memory (ROM), flash memory, hard disk drives, solid-state drives, volatile memory, non-volatile memory, semi-volatile memory, and/or the like. By one approach, the plurality of training modules may include basic texts, model forms, short handouts, instructional training videos, readings, and/or assessments designed as an outline, supplement, and/or refresher for workshops and/or trainee-trainer actual training sessions for one or more job functions at a facility. In such an approach, each training module may be associated with a particular area in the facility 200. In one configuration, each area in the facility may be associated with one or more cameras 114 distributed in the facility 200. As such, images captured by a particular camera 114 in the facility 200 may be determined to be images from a corresponding area that the particular camera 114 is associated with. In some implementations, associates working at the facility 200 may opt-in at the start of their employment and/or during their employment to store and associate their images, e.g., profile images and/or badge photos, in the one or more databases 116. As such, these stored images may be used by the remote control circuit 102 to perform image recognition and/or data processing to determine whether the individual captured in at least one of the images taken by at least one of the cameras 114 is one of the associates at the facility 200. By one approach, the image recognition and/or data processing may include one or more commercially and/or publicly available processing applications, software and/or techniques. In some implementations, a portable electronic device 104, 118 may include a smartphone, a laptop, a tablet, a smartwatch, among other types of electronic devices capable of being carried and moved around with ease from one place to another.

By one approach, the portable electronic device 104, 118 may communicatively couple to the remote control circuit 102. In one configuration, the remote control circuit 102 may communicatively couple to the plurality of wireless access points 112, the one or more databases 116, and/or the plurality of cameras 114. In some embodiments, the portable electronic device 104, 118 may include one or more sensors 110, 120 capable of capturing images of and/or scanning identifiers associated with an associate. For example, the one or more sensors 110, 120 may include cameras, optical sensors, biometric sensors, among other types of sensors capable of capturing biometric and/or non-biometric identifiers. In one scenario, the sensors 110, 120 may scan associate identifiers and provide the sensor data resulting from the scanning to the local control circuit 108 to process and/or use to identify, authenticate, and/or determine credentials of the corresponding associate. Alternatively or in addition to, the portable electronic device 104, 118 may include a wireless transceiver 106 communicatively coupled to a first wireless access point of the plurality of wireless access points 112 at a first time. For example, the first wireless access point is proximate to the portable electronic device 104, 118. In one scenario, the first wireless access point may be a wireless access point of the plurality of wireless access points 112 that is within a sensing distance of the portable electronic device 104, 118 and/or the wireless transceiver 106. In another scenario, the first wireless access point may broadcast a stronger wireless signal received by the portable electronic device 104, 118 than of those wireless signal broadcast by other wireless access point of the plurality of wireless access points 112. Alternatively or in addition to, the portable electronic device 104, 118 may include a local control circuit 108. By one approach, the local control circuit 108 may operate on the wireless transceiver 106 to couple with one of the plurality of wireless access points 112, e.g., the first wireless access point. In one configuration, the local control circuit 108 may receive an input initiating a training interface (not shown). By one approach, the training interface may include an application and/or software downloadable to the portable electronic device 104, 118 to enable the portable electronic device 104, 118 and/or the local control circuit 108 to at least access training modules associated with a trainee-associate of the plurality of associates in the facility 200. By one approach, associations of one or more training modules with the trainee-associate are based on job functions and/or work responsibilities the trainee-associate has and/or will have in the facility 200 and/or other facilities. In some implementations, the training interface may enable the portable electronic device 104, 118 to communicatively couple to the plurality of wireless access points 112, the remote control circuit 102, other portable electronic devices, and/or the one or more databases 116 via a communication network 122. For example, the communication network 122 may include wired network and/or wireless network having one or more communication protocols (e.g., WIFI, beacon-based communication, local area network (LAN), wide area network (WAN), ethernet, and/or the like). Alternatively or in addition to, the training interface may enable an associate and/or other associates with authorizations and/or credentials (e.g., trainer-associate, supervisor, etc.) to access training records, remaining uncompleted training modules, and/or training modules completion while in the facility 200 and/or other facilities.

In some implementations, the local control circuit 108 may prompt a user (e.g., a trainee-associate associated with the first portable electronic device 104) to provide a first associate identifier associated with the trainee-associate in response to the initiation of the training interface, at step 304 of FIG. 300. For example, a trainee-associate's job function may include handling payments for products purchased at a facility 200 (e.g., a retail store). In such an example, based on a profile stored in the one or more databases 116 of the trainee-associate, the trainee-associate has a first training module to be completed. By one approach, during a time of training the trainee-associate of how to work a cash register located at a front-end 210 of FIG. 2 of the retail store, the trainee-associate may activate the training interface via the local control circuit 108 receiving an input (based on the trainee-associate's activation) initiating the training interface, at step 302 of FIG. 3A. In one scenario, an associate identifier may include an identification associated with a badge assigned to an associate, a fingerprint, a facial profile, a retina scan, among other types of biometric and/or non-biometric identifications associated with and/or associable with a person (e.g., an associate). As such, the trainee-associate may scan the trainee-associate's badge, for example, in order for the training interface in cooperation with the local control circuit 108 to display a listing of training modules associated with the trainee-associate. For example, after scanning the trainee-associate's badge or scanning one or more types of identifications described herein, the remote control circuit 102 may receive the associate identifier of the trainee-associate and/or activate the training interface. By one approach, by providing the associate identifier of the trainee-associate to the remote control circuit 102 via the first wireless point access point, the remote control circuit 102 may determine that the trainee-associate is at an area in the facility 200 that is associated with the first wireless point access point. Alternatively or in addition to, the remote control circuit 102 may determine whether the trainee-associate is at an area associated with the first training module based on the area associated with the first wireless point access point, which the wireless access point that the portable electronic device 104, 118 is using to access the communication network 122. In one example, the local control circuit 108 may display the first training module of the plurality of training modules that the trainee-associate still to be trained on.

The systems and methods described herein can be configured to comply with privacy requirements which may vary between jurisdictions. For example, before any recording, collection, capturing or processing of user biometric data, a "consent to capture" process may be implemented. In such a process, consent may be obtained, from the user, via a registration process. Part of the registration process may be to ensure compliance with the appropriate privacy laws for the location where the training would be performed. The registration process may include certain notices and disclosures made to the user prior to the user recording the user's consent. No unauthorized collection or processing of biometric data of individuals occurs via exemplary systems and methods.

After registration, and before collection or processing of biometric data of the user occurs, a verification of the user as registered with the system and providing the required consents can occur. That is, the user's registration status as having consented to the collection of biometric data can be verified prior to collecting any biometric data. This verification can take place, for example, by the user entering a PIN (Personal Identification Number), password, and/or other code into a keypad, keyboard, or touch screen; by the user entering into a limited geofence location while carrying a fob, mobile device (such as a smartphone), or other RF transmitter, where the device has been configured to broadcast an authorization signal.

Once consent is verified, biometric data of the user can be captured, processed and used. Absent verification of consent, the camera, sensor, and/or other biometric data collection system must remain turned off. Once consent is verified, the camera, sensor and/or other biometric data collection system may be activated or turned on. If any biometric data is inadvertently collected from the user prior to verification of consent, the collected biometric data is immediately deleted, not having been saved to disk.

In some embodiments, any biometric data captured as part of the verification process is handled and stored by a single party at a single location. In some other embodiments where data must be transmitted to an offsite location for verification, certain disclosures prior to consent may be required, and the biometric data is encrypted. For example, the hashing of the biometric data received is a form of asymmetrical encryption which improves both data security and privacy, as well as reducing the amount of data which needs to be communicated.

In an illustrative non-limiting example, during the registration process and with the consent of the user, various biometric data may be obtained and/or captured from the user and subsequently stored in a database (e.g., the databases 116). In such an example, the one or more databases 116 may store a third plurality of associations of each registration information with each associate of the plurality of associates. By one approach, the registration information may include at least one of an indication of a consent by the associate of storage and collection of biometric data corresponding to the associate. By another approach, the registration may include an electronic device identifier associated with the consent. For example, the associate may register the portable electronic device 104, 118 (e.g., a fob, mobile device, the portable electronic device described herein, and/or the like) as being associated with the consent by the associate to the collection and/or storage of the associate's biometric data. As such, a determination by the remote control circuit 102 of the communication of the portable electronic device 104, 118 via the first wireless access point may indicate to the remote control circuit 102 the consent provided by the associate during the registration. Alternatively or in addition to, the remote control circuit 102 may determine whether the trainer-associate has consented to the storage and collection of the biometric data based on the third plurality of associations. In one configuration, in response to the determination that the trainer-associate has consented, the remote control circuit 102 may initiate storage of one or more images of the trainer-associate to the one or more databases. As such, in one example, in response to the initiation of the storage of the one or more images, the remote control circuit 102 may determine whether a portion of the one or more images substantially correspond to a stored image associated with the trainer-associate. Alternatively or in addition to, the remote control circuit 102 may determine whether an electronic device identifier may be associated with the portable electronic device 104 associated with the trainee-associate based on the communicative coupling of the wireless transceiver of the portable electronic device with the first wireless access point. In response to the determination, for example, the remote control circuit 102 may initiate the plurality of cameras 114 to start capturing the one or more images. Alternatively or in addition to, a determination by the remote control circuit 102 that a consent is absent from the registration information, the plurality of cameras 114 may not be initiated to capture the one or more images. By one approach, in response to the determination of the absence of consent, the verification message provided to the portable electronic device 104 may be based on areas associated with the training module and the first wireless access point being corresponding to the same area. By another approach, in response to the determination of the absence of consent, the training interface may not be initiated.

Figure 3A:
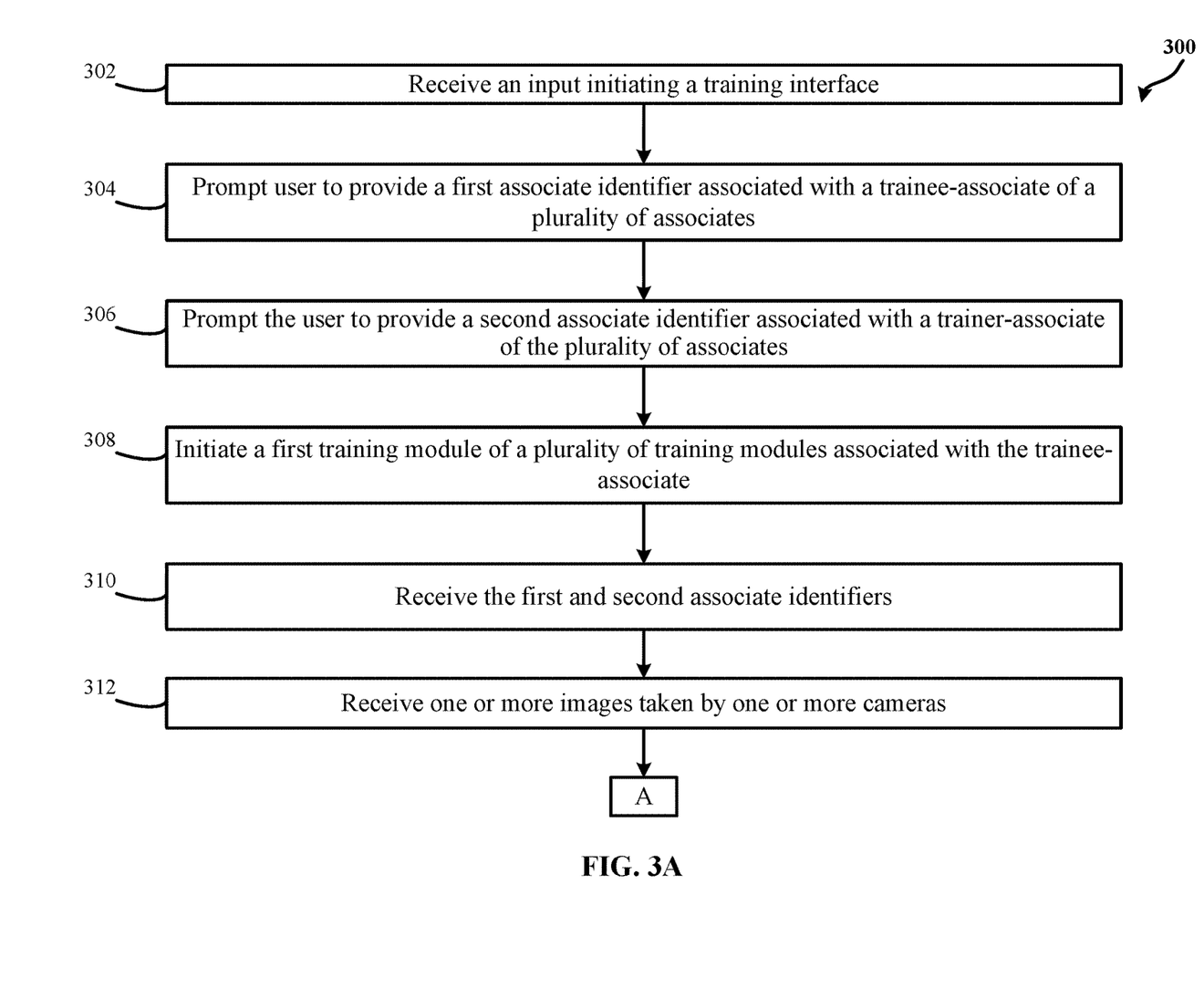
FIGS. 3A and 3B show a flow diagram of an exemplary process of verifying integrity of associate training in accordance with some embodiments.
Figure 3B:
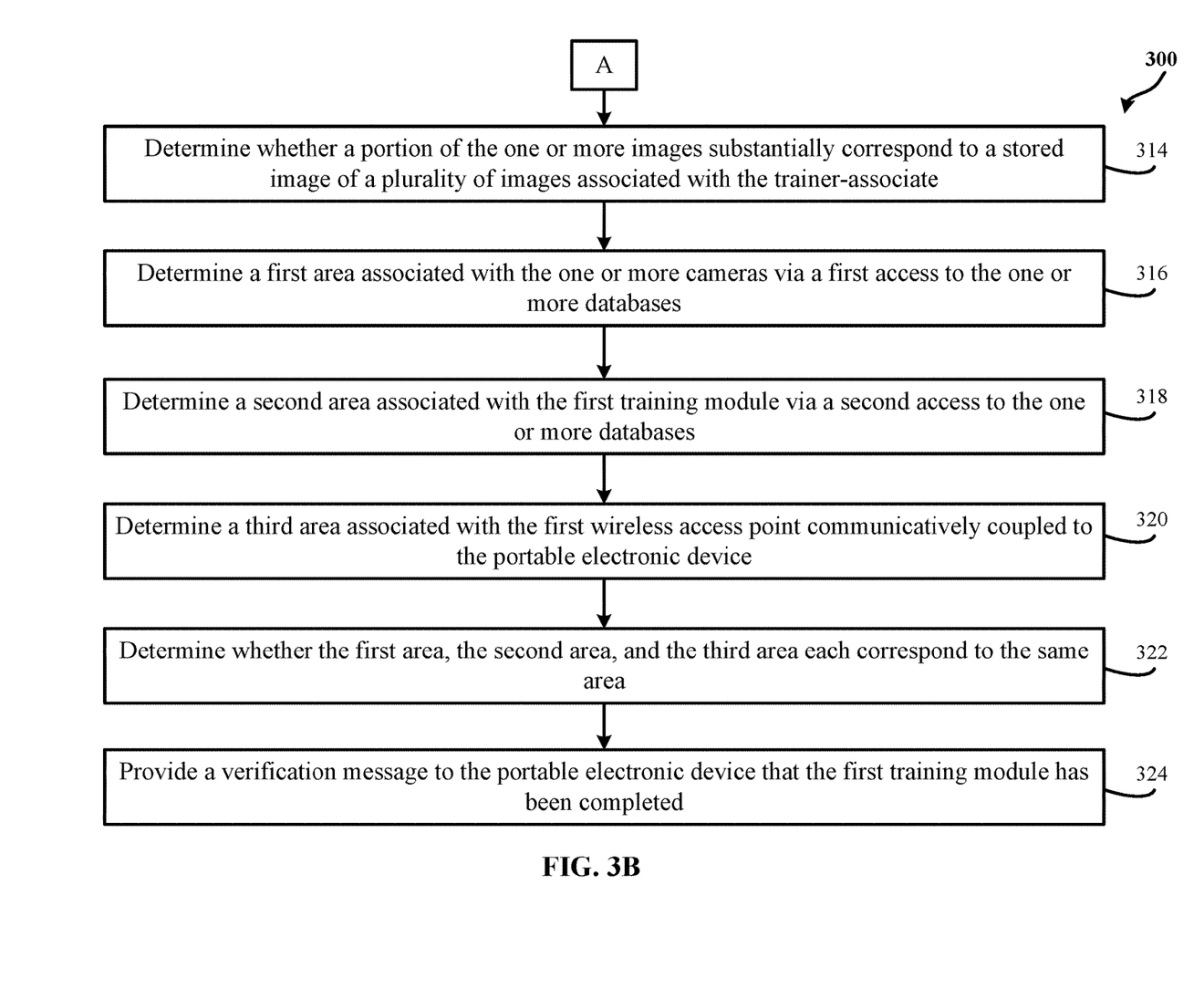

Alternatively or in addition to, the local control circuit 108 may prompt the user to provide a second associate identifier associated with a trainer-associate of the plurality of associates, at step 306. For example, the trainer-associate may scan its own badge, fingerprint, retina, and/or profile to identify and/or authenticate itself to the training interface using the portable electronic device 104 associated with the trainee-associate. Alternatively or in addition to, the trainer-associate may scan its own identifier using the portable electronic device 118 associated with itself. In some implementations, the local control circuit 108 in cooperation with the training interface and/or the remote control circuit 102 may, at step 308, initiate the first training module associated with the trainee-associate in response to the remote control circuit 102 receiving the first and second associate identifiers, at step 310. By one approach, the local control circuit 108 may keep track of a length of time the first training module is activated. In such an approach, the local control circuit 108 may provide the length of time to the remote control circuit 102.

In some embodiments, the remote control circuit 102 may, at step 312, receive one or more images taken by one or more cameras 114 at a first time. For example, subsequent to the remote control circuit 102 receiving the associate identifier of the trainee-associate and/or the associate identifier of the trainer-associate, the remote control circuit 102 may initiate receipt of images taken by the one or more cameras 114 proximate the first wireless access point. By one approach, the remote control circuit 102 may determine whether at least a portion of the one or more images substantially correspond to a stored image of the plurality of images associated with the trainer-associate, at step 314 of FIG. 3B. In such an approach, the remote control circuit 102 may perform facial recognition and/or data processing to determine whether the one or more images received from the one or more cameras 114 proximate the first wireless access point match with the images of the trainer-associate and/or the trainee-associate stored in the one or more databases 116. In one configuration, in response to the determination that at least the portion of the one or more images substantially correspond to the stored image, determine a first area associated with the one or more cameras 114 via a first access to the one or more databases 116, at step 316. For example, based on the determination that the one or more cameras 114 are proximate the first wireless access point, the remote control circuit 102 may determine that the one or more cameras 114 are associated with the area associated with the first wireless access point. Alternatively or in addition to, the remote control circuit 102 may determine an area associated with the one or more cameras 114 based on an access to the associations stored in the one or more databases 116. By one approach, the remote control circuit 102 may, at step 318, determine a second area associated with the first training module via a second access to the one or more databases 116. For example, the one or more databases 116 may have an association between one or more databases 116 with each area in the facility 200. Alternatively or in addition to, the remote control circuit 102 may, at step 320, determine a third area associated with the first wireless access point communicatively coupled to the portable electronic device 104,118. For example, the remote control circuit 102 may determine which one of the plurality of wireless access points 112 that the portable electronic device 104, 118 uses to communicate through the communication network 122 and determine the corresponding area based in part on an access to associations stored in the one or more databases 116 between wireless access points 112 and each area in the facility 200. In one configuration, the remote control circuit 102 may monitor the plurality of portable electronic devices 104, 118 coupled to each wireless access point in the facility 200. Alternatively or in addition to, the remote control circuit 102 may determine whether the first area, the second area, and the third area each correspond to the same area, at step 322. For example, the remote control circuit 102 may determine whether each area associated with the one or more cameras 114 that provide the captured images, the training module currently executed by the training interface, and the wireless access point coupled to the portable electronic device 104, 118 associated with the trainer-associate and/or the trainee-associate is referring to the same area. As such, a determination, by the remote control circuit 102 and/or the portable electronic device 104, 118 that the first, second, and third areas correspond to the same area verifies that the trainer-associate is with the trainee-associate at a designated area of the plurality of areas associated with the training module. Thus, the remote control circuit 102 and/or the portable electronic device 104 may determine whether the training is being held at a predetermined and/or designated area based on the area associated with the training module, the area associated with the wireless access point coupled to the portable electronic device 104, 118, and/or the areas associated with the one or more cameras 114 that captured the images associated with the trainer-associate and/or the trainee-associate. By one approach, the training may be provided by a supervisor and/or a designated instructor having credentials to provide training. By another approach, the training may be provided by a trainer-associate that is a peer of the trainee-associate. In such an approach, the peer-trainee-associate may be an associate that has obtained credentials by passing and/or completing training modules qualifying the peer-trainee-associate to train other associates in subject matter associated with the passed and/or completed training modules. Alternatively or in addition to, the remote control circuit 102 may, at step 324, provide a verification message to the portable electronic device 104, 118 that the first training module has been completed in response to the first, second, and third areas corresponding to the same area and/or subsequent to a completion of the first training module. By one approach, the completion history of training modules completed by the trainee-associate may be stored by the one or more databases 116 and/or associated with the profile of the trainee-associate. In such an approach, the remote control circuit 102 may initiate the one or more databases 116 to store the completion of the first training module by the trainee-associate. In one scenario, the completion of the first training module may be accessible at other facilities by the trainee-associate and/or individuals with authorization to access the completion of the first training module of the trainee-associate.

To further illustrate, another illustrative non-limiting example is described below. In FIG. 2, for example, the first portable electronic device 104 may be associated with a trainee-associate. At a first time and at the front-end 210 of the facility 200, the trainee-associate may initiate the training interface installed in the first portable electronic device 104 by scanning the badge of the trainee-associate using a first camera 204 of the first portable electronic device 104. By one approach, the first portable electronic device 104 may access and/or couple to the first wireless access point 202. In one example, the first wireless access point 202 substantially provides wireless coverage over the front-end 210. In such an example, the first wireless access point 202 may provide a stronger broadcast signal over the front-end 210 than the broadcast signal provided by other wireless access points. By another approach, the trainee-associate in cooperation with the local control circuit 108 and/or the remote control circuit 102 prompt the trainee-associate to scan using the first camera 204 the badge of the trainer-associate. As such, the first portable electronic device 104 may include a first sensor (e.g., the first camera 204, among other types of sensors described herein) that may capture the first associate identifier (e.g., the trainee-associate) and the second associate identifier (e.g., the trainer-associate). In some implementations, the local control circuit 108 of the first portable electronic device 104 may provide the first and second associate identifiers to the remote control circuit 102. By one approach, the remote control circuit 102 may determine whether the trainer-associate is qualified to train the trainee-associate based on an identification by the remote control circuit 102 that the second associate identifier matches with one of a listing of qualified associate identifiers associated with the first training module via an access to the one or more databases 116. In such an approach, in response to the determination that the second associate identifier does not match with one of the listing of qualified associate identifiers, the remote control circuit 102 prevent the initiation of the first training module by the local control circuit 108 and/or the training interface. In some embodiments, during the training, the remote control circuit 102 may periodically determine the areas associated with the first portable electronic device 104, the first camera 204, and/or the first wireless access point 202 and/or compare and/or determine whether the determined areas correspond with the areas associated with the first training module. Thus, the remote control circuit 102 may determine whether the training is being held at one or more predetermined and/or designated areas based on the one or more areas associated with the first training module, the one or more areas associated with the first wireless access point 202 coupled to the first portable electronic device 104, and/or the areas associated with the one or more first cameras 204 that captured the images associated with the trainer-associate and/or the trainee-associate. By one approach, in response to the determination that the areas associated with the first wireless access point 202, the first training module, and/or the one or more first cameras 204 correspond to the same areas, the remote control circuit 102 may provide a verification message to the first portable electronic device 104 that the first training module has been completed. Alternatively or in addition to, the remote control circuit 102 and/or the local control circuit 108 may determine whether the completion of the first training module by the trainee-associate is within a predetermined range of time. In one configuration, in response to the determination that the completion of the first training module is not within the predetermined range of time, the remote control circuit 102 and/or the local control circuit 108 may prevent the verification message from being provided to the first portable electronic device 104. In such a configuration, the remote control circuit 102 and/or the local control circuit 108 may provide an unsatisfactory completion message to the first portable electronic device 104. In one scenario, in receiving the unsatisfactory completion message, training interface in cooperation with the local control circuit 108 may prompt the trainee-associate to repeat the first training module. Continuing the illustrative non-limiting example above, the trainee-associate may initiate a second training module. For example, the second training module, for example, may correspond to using a forklift at a loading/unloading dock 212 in the facility 200. As such, at a second time and at the loading/unloading dock 212, the trainee-associate may initiate the training interface, for example, via a fingerprint scan, using the first camera 204. Alternatively or in addition to, the trainee-associate may initiate the training interface via logging into the training interface and/or initiating the training interface. As such, in response, the local control circuit 108 may prompt the trainee-associate to provide the first identifier of the trainee-associate. By one approach, instead of the first portable electronic device 104 scanning the second identifier of the trainer-associate, a second camera 208 of a second portable electronic device 118 may scan the second identifier of the trainer-associate when prompted by the local control circuit 108. In one configuration, in response to the scanning of the second identifier of the trainer-associate and/or the receipt of the second identifier, the remote control circuit 102 may determine that the trainer-associate is at the same area as the trainee-associate based on a determination by the remote control circuit 102 that both the first and second portable electronic devices 104, 118 access and/or coupled to a second wireless access point 206. As such, the remote control circuit 102 may associate that the scanning of the second identifier of the trainer-associate may be in response to the prompting by the training interface in cooperation with the local control circuit 108 of the first portable electronic device 104 to provide the second identifier associated with the trainer-associate. For example, the remote control circuit 102 may determine a fourth area associated with the second wireless access point 206 communicatively coupled to the second portable electronic device 118. By one approach, the remote control circuit 102 may determine whether the fourth area correspond to the same area as the area associated with the second training module, the area associated with the second wireless access point 206 coupled to the first portable electronic device 104, and/or the area associated with the second camera 114 that captured the images associated with the trainer-associate and/or the trainee-associate. In one configuration, the remote control circuit 102 may provide a verification message to the first portable electronic device 104 that the second training module has been completed in response to the determination that the fourth area along with the areas associated with the second training module, the second wireless access point 206, and/or the second camera 114 correspond to the same area and/or subsequent to the completion of the second training module. As such, the remote control circuit 102 may determine whether the training is being held at a predetermined and/or designated area based on the area associated with the second training module, the area associated with the second wireless access point 206 coupled to both the first and second portable electronic devices 104,118, and/or the area associated with the second camera 114 that captured the images associated with the trainer-associate and/or the trainee-associate. Thus, a determination that the areas determined for each of the second training modules, the second wireless access point 206, and/or the second camera 114 being the same area verifies that the trainer-associate is with the trainee-associate at a designated area associated with the second training module.

Figure 4:
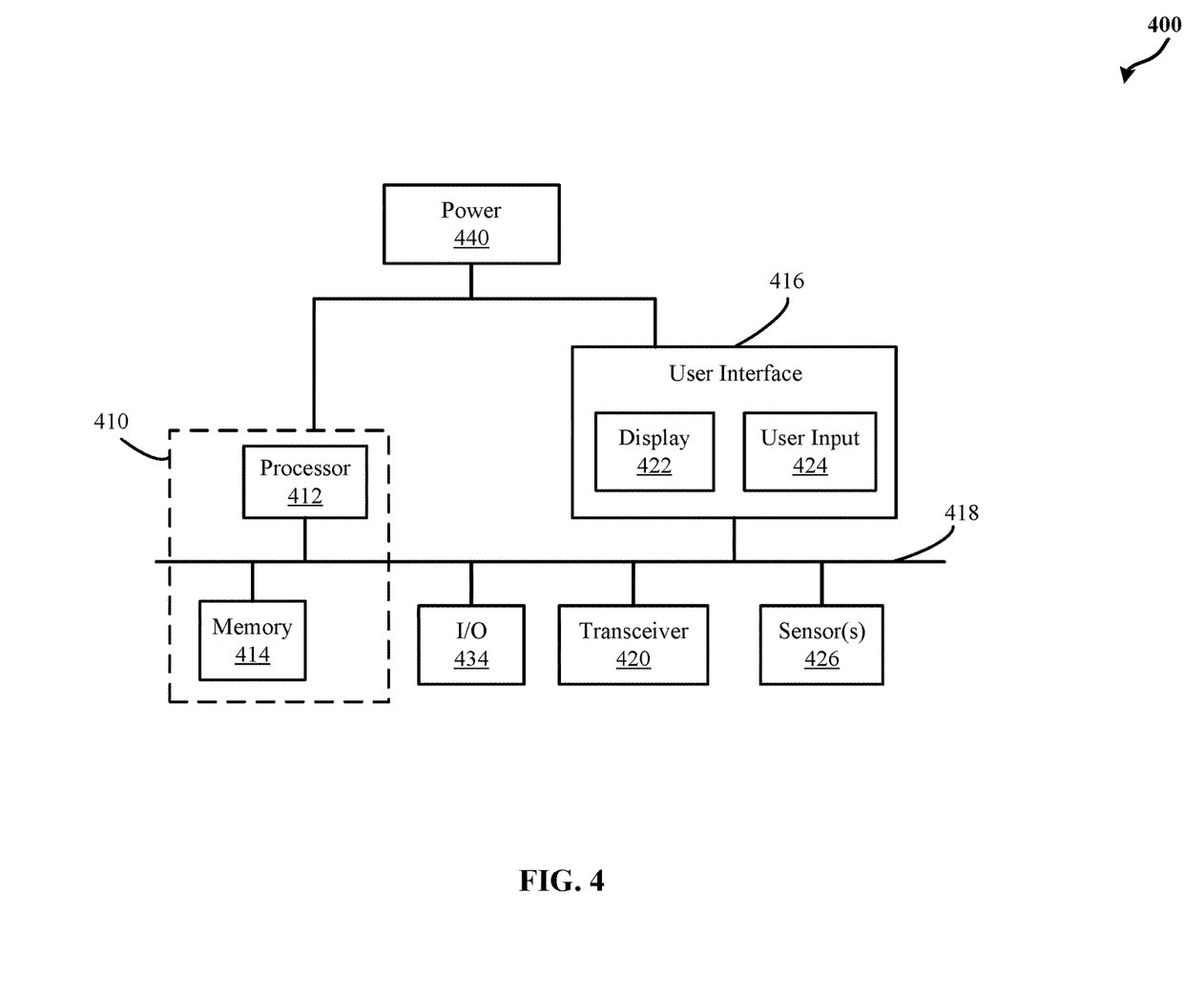
FIG. 4 illustrates an exemplary system for use in implementing methods, techniques, devices, apparatuses, systems, servers, sources and verifying integrity of associate training, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 4 illustrates an exemplary system 400 that may be used for implementing any of the components, circuits, circuitry, systems, functionality, apparatuses, processes, or devices of the system 100 of FIG. 1, the method 300 of FIGS. 3A-3B, and/or other above or below mentioned systems or devices, or parts of such circuits, circuitry, functionality, systems, apparatuses, processes, or devices.

For example, the system 400 may be used to implement some or all of the system for verifying integrity of associate training at a facility, the remote control circuit 102, the one or more databases 116, the portable electronic device 104, 118, the local control circuit 108, the wireless transceiver 106, the communication network 122, the plurality of wireless access points 112, the first sensor 110, the second sensor 120, the plurality of cameras 114, the first wireless access point 202, the first cameras 204, the second wireless access point 206, the second cameras 208, and/or other such components, circuitry, functionality and/or devices. However, the use of the system 400 or any portion thereof is certainly not required.

By way of example, the system 400 may comprise a processor module (or a control circuit) 412, memory 414, and one or more communication links, paths, buses or the like 418. Some embodiments may include one or more user interfaces 416, and/or one or more internal and/or external power sources or supplies 440. The control circuit 412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 412 can be part of control circuitry and/or a control system 410, which may be implemented through one or more processors with access to one or more memory 414 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 400 may be used to implement one or more of the above or below, or parts of, components, circuits, systems, processes and the like. For example, the system 400 may implement the system for verifying integrity of associate training at a facility with the remote control circuit 102 and/or the local control circuit 108 being the control circuit 412.

The user interface 416 can allow a user to interact with the system 400 and receive information through the system. In some instances, the user interface 416 includes a display 422 and/or one or more user inputs 424, such as buttons, touch screen, track ball, keyboard, mouse, etc., which can be part of or wired or wirelessly coupled with the system 400. Typically, the system 400 further includes one or more communication interfaces, ports, transceivers 420 and the like allowing the system 400 to communicate over a communication bus, a distributed computer and/or communication network (e.g., a local area network (LAN), the Internet, wide area network (WAN), etc.), communication link 418, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) interface 434 that allow one or more devices to couple with the system 400. The I/O interface can be substantially any relevant port or combinations of ports, such as but not limited to USB, Ethernet, or other such ports. The I/O interface 434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 426 to provide information to the system and/or sensor information that is communicated to another component, such as the remote control circuit 102, the one or more databases 116, the portable electronic device 104, 118, the local control circuit 108, the wireless transceiver 106, the communication network 122, the plurality of wireless access points 112, the first wireless access point 202, the second wireless access point 206, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 400 comprises an example of a control and/or processor-based system with the control circuit 412. Again, the control circuit 412 can be implemented through one or more processors, controllers, central processing units, logic, software and the like. Further, in some implementations the control circuit 412 may provide multiprocessor functionality.

The memory 414, which can be accessed by the control circuit 412, typically includes one or more processor readable and/or computer readable media accessed by at least the control circuit 412, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit 412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 414 can store code, software, executables, scripts, data, content, lists, programming, programs, log or history data, user information, customer information, product information, and the like. While FIG. 4 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for verifying integrity of associate training at a facility comprising:
   a plurality of wireless devices distributed throughout the facility, wherein each wireless device is associated with one of a plurality of areas in the facility;
   a plurality of sensors, each sensor configured to sense data from the one of the plurality of areas;
   one or more databases configured to store at least one of: a plurality of training modules, a first plurality of associations of each of the plurality of areas with at least one corresponding training module of the plurality of training modules, a second plurality of associations of each of the plurality of areas with at least one corresponding sensor of the plurality of sensors, or sensed data associated with a plurality of associates;
   a control circuit configured to:
      receive a first associate identifier and a second associate identifier from a first training interface operable on a first portable electronic device, wherein the first associate identifier is associated with a trainee-associate of the plurality of associates, wherein the second associate identifier is associated with a trainer-associate of the plurality of associates;
      determine whether the trainer-associate is qualified to train the trainee-associate based on the second associate identifier received from the first training interface;
      initiate a first training module in response to a determination that the trainer-associate is qualified to train the trainee-associate, wherein the first training module is associated with the trainee-associate;
      determine a first area associated with one or more sensors via a first access to the one or more databases based on one or more sensed data from the one or more sensors;
      determine a second area associated with the first training module via a second access to the one or more databases;
      determine a third area associated with a first wireless device communicatively coupled to the first portable electronic device;
      determine whether the first area, the second area, and the third area each correspond to the same area, wherein the determination that the first, second, and third areas correspond to the same area verifies that the trainer-associate is with the trainee-associate at a designated area of the plurality of areas associated with the first training module; and
      in response to the first, second, and third areas corresponding to the same area and subsequent to a completion of the first training module, provide a verification message to the first training interface that the first training module has been completed; and
   the first training interface executed on the first portable electronic device configured to:
      activate in response to an input from a user;
      transmit the first associate identifier and the second associate identifier; and
      receive and display the verification message indicating the completion of the first training module.

2. The system of claim 1, further comprising the first training interface configured to:
   prompt the user to provide the first and second associate identifiers; and
   in response to the receipt of the first and second associate identifiers, initiate the first training module associated with the trainee-associate.

3. The system of claim 1, further comprising:
   the first training interface configured to:
      prompt a first user to provide the first associate identifier; and
   a second training interface operable on a second portable electronic device, the second training interface configured to:
      prompt a second user to provide the second associate identifier,
   wherein the control circuit is further configured to:
      determine a fourth area associated with the first wireless device communicatively coupled to the second portable electronic device;
      determine whether the fourth area correspond to the same area as the first, second, and third areas; and
      in response to the determination that the fourth area along with the first, second, and third areas correspond to the same area and subsequent to the completion of the first training module, provide the verification message to the first portable electronic device that the first training module has been completed.

4. The system of claim 3, wherein the first and second portable electronic devices each separately comprises at least one of a smartphone or a smartwatch.

5. The system of claim 1, wherein the first and second associate identifiers comprise a badge identification, a fingerprint, a retina scan, and a facial profile.

6. The system of claim 1, wherein the trainer-associate and the trainee-associate are peers.

7. The system of claim 1, wherein the control circuit is further configured to initiate the one or more databases to store the completion of the first training module by the trainee-associate, and wherein the completion of the first training module is accessible at other facilities.

8. The system of claim 1, wherein the control circuit is further configured to:
   determine whether the trainer-associate is qualified to train the trainee-associate based on an identification by the control circuit that the second associate identifier matches with one of a listing of qualified associate identifiers associated with the first training module; and
   in response to the determination that the second associate identifier does not match with one of the listing of qualified associate identifiers, prevent the initiation of the first training module.

9. The system of claim 1, wherein the control circuit is further configured to:
   determine whether the completion of the first training module by the trainee-associate is within a predetermined range of time;
   in response to the determination that the completion of the first training module is not within the predetermined range of time, prevent the verification message from being provided to the first training interface; and
   provide an unsatisfactory completion message to the first training interface.

10. The system of claim 1, wherein the one or more databases is further configured to store a third plurality of associations of each registration information with a corresponding associate of the plurality of associates, wherein the registration information comprises at least one of an indication of a consent by the corresponding associate of storage and collection of biometric data of the corresponding associate or an electronic device identifier associated with the consent, wherein the control circuit is further configured to:
- determine whether the trainer-associate has consented to the storage and collection of biometric data based on the third plurality of associations; and
- in response to the determination that the trainer-associate has consented, initiate storage of the one or more sensed data to the one or more databases and a determination of whether a portion of the sensed data substantially corresponds to a stored sensed data associated with the trainer-associate.

11. The system of claim 1, wherein the one or more databases is further configured to store a third plurality of associations of each registration information with a corresponding associate of the plurality of associates, wherein the registration information comprises at least one of an indication of a consent by the corresponding associate of storage and collection of biometric data of the corresponding associate or an electronic device identifier associated with the consent, wherein the control circuit is further configured to:
- determine whether a first electronic device identifier is associated with the first portable electronic device associated with the trainee-associate based on a communicative coupling of the first portable electronic device with the first wireless device; and
- in response to the determination, initiate the one or more sensors to start sensing the sensed data from the one of the plurality of areas.

12. A method for verifying integrity of associate training at a facility comprising:
- receiving, by a control circuit, a first associate identifier and a second associate identifier, wherein the first associate identifier is associated with a trainee-associate of a plurality of associates, wherein the second associate identifier is associated with a trainer-associate of the plurality of associates;
- determining, by the control circuit, whether the trainer-associate is qualified to train the trainee-associate based on the second associate identifier received from a first training interface;
- initiating, by the control circuit, a first training module in response to a determination that the trainer-associate is qualified to train the trainee-associate, wherein the first training module is associated with the trainee-associate;
- determining, by the control circuit, a first area associated with one or more sensors via a first access to one or more databases based on sensed data of the one or more sensors;
- determining, by the control circuit, a second area associated with the first training module via a second access to the one or more databases;
- determining, by the control circuit, a third area associated with a first wireless device communicatively coupled to a first portable electronic device;
- determining, by the control circuit, whether the first area, the second area, and the third area each correspond to the same area, wherein the determination that the first, second, and third areas correspond to the same area verifies that the trainer-associate is with the trainee-associate at a designated area in the facility associated with the first training module;
- in response to the first, second, and third areas corresponding to the same area and subsequent to a completion of the first training module, providing, by the control circuit, a verification message to the first portable electronic device that the first training module has been completed;
- activating, by the first training interface executed on the first portable electronic device, in response to an input from a user;
- transmitting, by the first training interface, the first associate identifier and the second associate identifier; and
- receiving and displaying, by the first training interface, the verification message indicating completion of the first training module.

13. The method of claim 12, further comprising:
- capturing, by the first training interface operable on the first portable electronic device, the first and second associate identifiers; and
- providing, by the first training interface, the first and second associate identifiers to the control circuit.

14. The method of claim 12, further comprising
- capturing, by the first training interface operable on the first portable electronic device, the first associate identifier;
- capturing, by a second training interface operable on a second portable electronic device communicatively coupled to the first wireless device, the second associate identifier;
- determining, by the control circuit, a fourth area associated with the first wireless device communicatively coupled to the second portable electronic device;
- determining, by the control circuit, whether the fourth area correspond to the same area as the first, second, and third areas; and
- in response to the determining that the fourth area along with the first, second, and third areas correspond to the same area and subsequent to the completion of the first training module, providing, by the control circuit, the verification message to the first portable electronic device that the first training module has been completed.

15. The method of claim 14, wherein the first and second portable electronic devices each separately comprises at least one of a smartphone or a smartwatch.

16. The method of claim 12, wherein the first and second associate identifiers comprise a badge identification, a fingerprint, a retina scan, and a facial profile.

17. The method of claim 12, wherein the trainer-associate and the trainee-associate are peers.

18. The method of claim 12, further comprising initiating, by the control circuit, the one or more databases to store the completion of the first training module by the trainee-associate, wherein the completion of the first training module is accessible at other facilities.

19. The method of claim 12, further comprising:
- determining, by the control circuit, whether the trainer-associate is qualified to train the trainee-associate based on an identification by the control circuit that the second associate identifier matches with one of a listing of qualified associate identifiers associated with the first training module; and
- in response to the determining that the second associate identifier does not match with one of the listing of qualified associate identifiers, preventing, by the control circuit, the initiation of the first training module.

20. The method of claim 12, further comprising:
- determining, by the control circuit, whether the completion of the first training module by the trainee-associate is within a predetermined range of time;

in response to the determining that the completion of the first training module is not within the predetermined range of time, preventing, by the control circuit, the verification message from being provided to a first training interface operable on the first portable electronic device; and providing, by the control circuit, an unsatisfactory completion message to the first training interface.

21. The method of claim 12, further comprising:

determining, by the control circuit, whether the trainer-associate has consented to a storage and collection of biometric data based on a third plurality of associations of each registration information with a corresponding associate of the plurality of associates stored in the one or more databases, wherein the registration information comprises at least one of an indication of a consent by the trainer-associate of the storage and collection of biometric data corresponding to the trainer-associate or an electronic device identifier associated with the consent; and in response to determining that the trainer-associate has consented, initiating storage of the sensed data to the one or more databases and the determination of whether a portion of the sensed data substantially corresponds to a stored sensed data associated with the trainer-associate.

22. The method of claim 12, further comprising:

determining, by the control circuit, whether an electronic device identifier associated with a consent by the trainee-associate of storage and collection of biometric data corresponding to the trainee-associate is associated with the first portable electronic device of the trainee-associate based on a communicative coupling of the first portable electronic device with the first wireless device; and in response to determining that the electronic device identifier associated with the consent, initiating the one or more sensors to start sensing the sensed data.

* * * * *